United States Patent [19]

Jänsch

[11] Patent Number: 4,640,126
[45] Date of Patent: Feb. 3, 1987

[54] DEVICE FOR MEASURING OIL LEVEL IN AN INTERNAL COMBUSTION ENGINE

[75] Inventor: Peter A. G. Jänsch, Gothenburg, Sweden

[73] Assignee: Saab-Scania Aktiebolag, Sodertalje, Sweden

[21] Appl. No.: 735,732

[22] Filed: May 20, 1985

[30] Foreign Application Priority Data

May 21, 1984 [SE] Sweden ................... 8402722

[51] Int. Cl.$^4$ .............................. G01F 23/04
[52] U.S. Cl. ................. 73/290 R; 73/290 B; 116/227; 33/126.7 A
[58] Field of Search ............. 33/126.7 R, 126.7 A, 33/126.9 R; 73/290 B, 290 R; 116/227; 374/146; 220/209, 293, 295, 212, DIG. 32; 403/131, 144; 184/1.5, 105 R, 88 R

[56] References Cited

U.S. PATENT DOCUMENTS

| | | | |
|---|---|---|---|
| 892,466 | 7/1908 | Sweeney | 220/DIG. 32 |
| 1,501,407 | 7/1924 | Le Clair | 33/126.7 R |
| 1,596,115 | 8/1926 | Pardee | 220/DIG. 32 |
| 1,887,700 | 11/1932 | Stevens | 220/295 |
| 2,161,433 | 6/1939 | Ritz-Woller | 403/144 |
| 2,179,136 | 11/1939 | Shoemaker | 220/295 |
| 2,966,879 | 1/1961 | Farrell | 116/227 |
| 3,006,499 | 10/1961 | Corbett | 220/293 |
| 3,474,884 | 10/1969 | Braun | 33/126.7 |
| 4,392,583 | 7/1983 | Wong | 220/209 |
| 4,531,293 | 7/1985 | Grinde | 33/126.7 R |

FOREIGN PATENT DOCUMENTS

1279006  11/1961  France ................... 403/138

*Primary Examiner*—Charles Frankfort
*Assistant Examiner*—W. Morris Worth
*Attorney, Agent, or Firm*—Cushman, Darby & Cushman

[57] ABSTRACT

A device for measuring the oil level in an internal combustion engine, which enables an oil dipstick to remain in the oil filling opening to engines even during filling. At its upper end the dipstick is connected to a cap for the oil filling opening, and the dipstick is intended to be accommodated in a tube or a like device communicating with an oil container for the engine. The invention is substantially distinguished in that the dipstick is articulately connected to the cap and allows tilting of the dipstick relative the cap, enabling the cap to be hung on the upper edge of the tube during oil filling.

1 Claim, 3 Drawing Figures

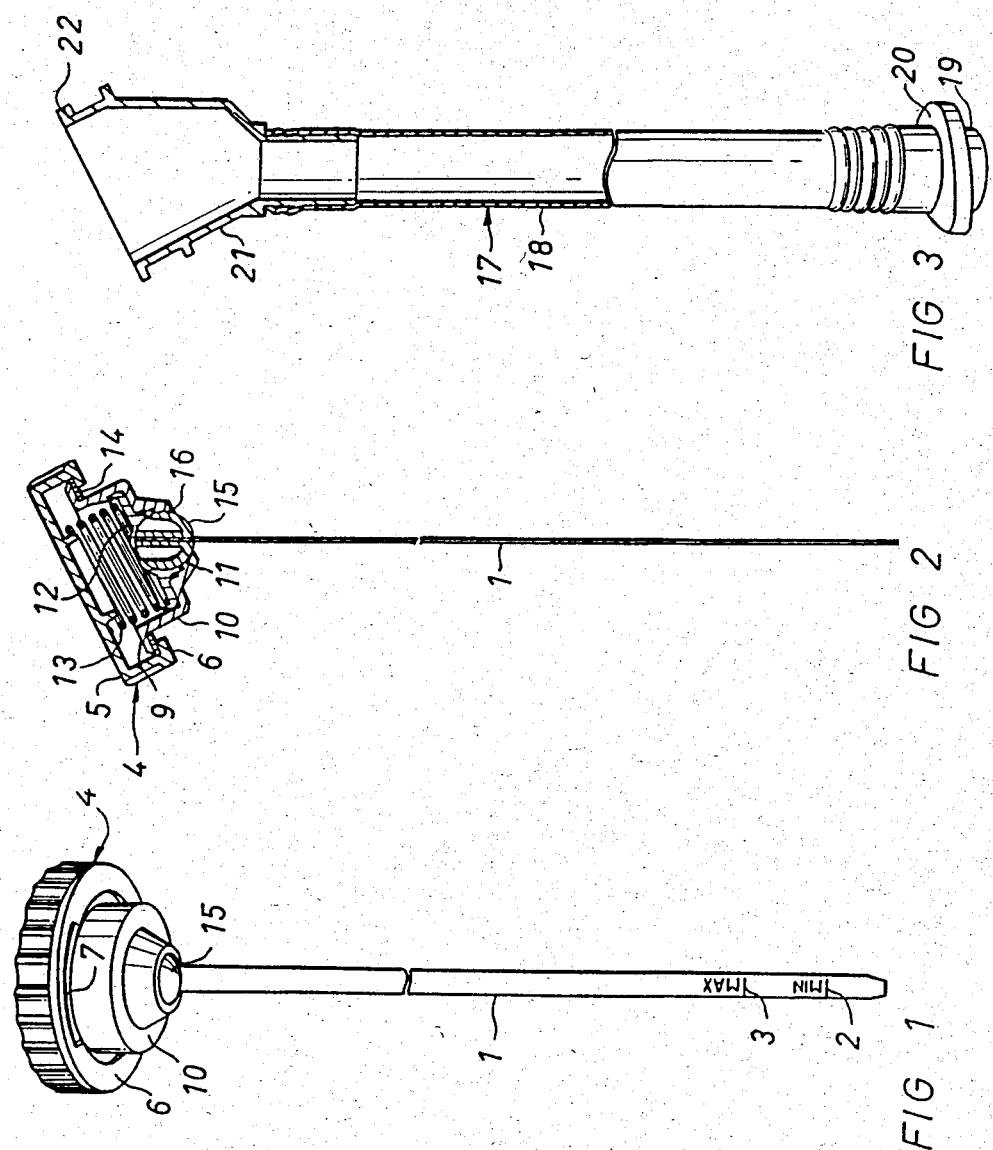

DEVICE FOR MEASURING OIL LEVEL IN AN INTERNAL COMBUSTION ENGINE

The present invention relates to a device in an oil level meter for an internal combustion engine including an oil dipstick which at one end is connected to a cap for an oil filling opening, said oil dipstick being intended for accommodating in a measuring tube or similar means communicating with an oil container for the engine.

With internal combustion engines it is known to utilize a dipstick for indicating the oil level in the engine crankcase. The dipstick is normally located in a measuring pipe or similar means communicating with the crankcase. There are marks at the lower end of the dipstick, intended to indicate the minimum and maximum oil level in the engine.

In a known embodiment, the dipstick and its tube are solely used for oil level indication. A special opening is thus required for filling oil, this opening being arranged in the engine valve casing. This opening in the casing is unsatisfactory from several aspects. When filling oil, spilt oil often runs outside the opening and down on to the engine manifold and exhaust pipe, resulting in that oil is burnt on to them. Furthermore, the valve casing is often placed directly on top of the engine block, which results in that the opening is placed in the vicinity of the center of the engine compartment, where the opening is least accessible. A further disadvantage with a separate oil filling opening in the valve casing would be that oil can be thrown out of the opening when the cap is not properly put on.

In another known embodiment an oil dipstick is arranged in a tube which is also used for filling oil. The need of a separate filling opening in the valve case and the disadvantages connected with it are thus eliminated. In this case the dipstick is attached at its upper end to a cap which is intended to be screwed on to the upper end of the tube, thereby covering the opening to the engine oil sump.

In this embodiment the dipstick and cap must be removed from the opening when filling oil, which often results in the practical problem of where to put the dipstick when it is removed. It is often put on the engine which is thus dirtied by oil. It is just as often put down on some dirty surface, resulting in that before it can be replaced in the opening it must be wiped off, so as not to contaminate the oil in the engine.

The present invention has the object of facilitating handling of the dipstick and cap for the filling opening in internal combustion engines, and is substantially distinguished in that the dipstick is articulately connected to the cap to allow tilting of the dipstick relative the cap.

An inventively implemented oil level meter allows, e.g. when filling oil, that after removing the cap from the oil filling tube, the dipstick can be readily lifted to a position in which, by tilting the cap, the cap can be caused to hang over the upper edge of the tube.

The invention also allows considerable adaptability with respect to location and implementation of the dipstick tube. The tube can thus be placed at an angle relative the engine and placed in the engine compartment so that it is easily accessible for filling oil and checking the oil level. The upper end of the dipstick tube can then be formed, preferably with an inclination relative the longitudinal extension of the tube, so that oil spillage is avoided.

Other distinguishing features of the invention will be perceived from the following description of an embodiment exemplifying it. The description is made with reference to the accompanying drawings, on which FIG. 1 is a perspective view of an inventive oil dipstick, FIG. 2 is a longitudinal section of the dipstick, and FIG. 3 is a side view, partially in longitudinal section, of a tube for the dipstick.

An oil level meter exemplified in FIGS. 1 and 2 includes an oil dipstick 1 provided with markings 2 and 3 on its lower portion. The markings 2,3 are intended in practice to indicate minimum and maximum oil level in an internal combustion engine (not shown). The upper end of the dipstick 1 is connected to a cap 4 intended for placing on an oil filling opening to the engine. The cap 4 includes a cover 5 formed with a lower radially inwardly directed flange 6, in which are arranged two arcuate cutouts 7 for bayonet-type attachment of the cover 5 to the upper edge of the filling pipe. A corresponding flange 9 on a sealing cover 10 bears against the inside of the inwardly directed flange 6. This sealing cover 10 extends through the cover 5 and at its downward end is formed with inner bearing surfaces 11 of spherical shape.

The sealing cover 10 accommodates a bearing washer 12 which is urged by a compression spring 13 into engagement against the sealing cover 10. One end of the compression spring 13 engages against the inside of the cover 5 and also indirectly urges the flange 9 of the sealing cover 10 into engagement with the inside of the flange 6 of the cover 5. A sealing ring 14 is placed between the flanges 6 an 9.

The bearing washer 12 is further formed with a central bearing surface having a spherical shape conforming to the spherical bearing surfaces 11 of the sealing cover 10. A bearing ball 15 of substantially spherical shape is mounted between the spherical bearing surfaces on the sealing cover 10 and the bearing washer 12. The bearing ball 15 is conventionally connected to the upper end of the dipstick 1. The latter has longitudinal extension downwards through a central hole 16 in the sealing cover 10.

The above-described cap 4 with the dipstick fastened therein is intended for mounting on an oil measuring tube 17 illustrated in FIG. 3. The lower part of the tube is a plastic tube 18 which is pressed onto a connector 19 on an oil container (not shown). The connector 19 is fastened to the oil container via a flange 20, and the tube 17 is in communication with the oil container via the connector 19.

The upper end of the oil measuring tube 17 consists of a funnel 21 which is pressed into the plastic tube 18. The upper end of the funnel 21 is provided with radially outwardly directed lugs 22 which are intended for coaction with the cutouts 7 in the cover 5 to form a bayonet-type connection. The funnel 21 is also provided externally with attachment lugs (not shown), with which the funnel can be suspended in a fixed position connected to the engine. When the cap 4 and dipstick 1 are mounted on the tube 17, the lower part of the dipstick 1 is immersed in oil, the level of which is indicated on the dipstick 1 conventionally.

The cover 5 is attached to the funnel 21 by the bayonet fastening 7,22, the sealing cover 10 then being urged into engagement via its sealing ring 14 against the upper edge of the funnel 21 under bias from the spring 13. The spring 13 is here dimensioned so that if the pressure in the tube 17 exceeds a given value, e.g. 0.2 bar, the spring is not sufficiently strong to urge the sealing cover 10 into sealing engagement against the upper edge of the funnel 21. There is thus avoided too great a pressure being formed in the tube 17 and in the oil container communicating with it.

When checking the oil level in an internal combustion engine, the cover 5 is removed and the oil level in the oil sump read off conventionally on the dipstick 1. When it is required to fill oil, the inventive dipstick 1 can remain in the tube 17 during filling, and the cover 5 can be tilted and hung over the edge of the funnel 21. Since the dipstick can be inclined relative the cover 5, the funnel 21 and its edges can be made sloping and thereby facilitate filling oil. The tube 17 may also be placed in an easily accessible position in spite of the oil container being unsuitably placed.

The invention has been described hereinbefore as being utilized with an unspecified oil container. This oil container is preferably the oil sump for engine lubrication oil in an internal combustion engine. However, the invention is in no way limited to this field of application, and within the scope of the inventive concept and following claims, it may be utilized for different, modified embodiments. The invention can thus also be utilized for vehicle gearboxes with their oil containers, vehicle brake oil containers and the like. The invention is also applicable to containers for liquids other than oil.

I claim:

1. An oil level meter for an internal combustion engine comprising:

a measuring tube communicating with an oil reservoir in said engine;

a cap for covering an open end of said measuring tube, said cap including a cover formed for connection to said measuring tube; a sealing cover formed with an inner spherical bearing surface; said measuring tube cover and said sealing cover having means for securing said covers together while allowing limited axial movement therebetween; and a sealing member associated with said sealing cover for engaging the open end of said measuring tube;

a bearing washer with a spherical bearing surface and a compression spring biased between the inside of the measuring tube cover and one side of the bearing washer; said compression spring urging said sealing cover and said sealing member toward engagement with said open end of said measuring tube;

a rigid oil dipstick; and a bearing ball rigidly connected at one end of said dipstick and located between the spherical bearing surfaces of the bearing washer and the sealing cover and under urging of said compression spring articulately connect said cap and said dipstick, thereby forming a ball joint allowing the cap to tilt in all directions relative to the dipstick.

* * * * *